United States Patent [19]

Ciao

[11] Patent Number: 5,704,178
[45] Date of Patent: Jan. 6, 1998

[54] RUBBER BUILDING PANEL AND METHOD OF MANUFACTURING SAME

[76] Inventor: Angelo Ciao, P.O. Box 4582, South Bend, Ind. 46634

[21] Appl. No.: 584,311

[22] Filed: Jan. 11, 1996

[51] Int. Cl.⁶ .................................................. E04C 2/26
[52] U.S. Cl. .............. 52/309.1; 52/309.16; 52/309.17; 52/764; 52/781.3; 52/802.1; 52/802.11; 52/DIG. 9
[58] Field of Search ............... 52/309.1, 309.16, 52/309.17, 802.1, 802.11, 764, 781.3, DIG. 9

[56] References Cited

U.S. PATENT DOCUMENTS

| | | | |
|---|---|---|---|
| 3,885,008 | 5/1975 | Martin | 52/802.1 X |
| 4,109,041 | 8/1978 | Tellman | |
| 4,343,669 | 8/1982 | Prior | |
| 4,774,794 | 10/1988 | Grieb | 52/309.16 X |
| 4,914,883 | 4/1990 | Wencley | 52/801.1 X |
| 5,010,943 | 4/1991 | Boyer | 160/351 |
| 5,094,905 | 3/1992 | Murray | |
| 5,096,772 | 3/1992 | Snyder | |
| 5,238,734 | 8/1993 | Murray | |
| 5,316,708 | 5/1994 | Drews | |
| 5,417,023 | 5/1995 | Mandish | |
| 5,439,735 | 8/1995 | Jamison | |

Primary Examiner—Christpher Kent
Attorney, Agent, or Firm—Gifford, Krass, Groh, Sprinkle, Patmore, Anderson & Citkowski, P.C.

[57] ABSTRACT

The use of rubber fragments from discarded tires in building panels, including panels suitable for house construction. A rubber panel is constructed of metal frame members, using a metal mesh on the interior for structural strength and support, and ground up rubber fragments which may contain strands of steel or other metal or fibre reinforcing materials present in tires. These fragments are mixed with an appropriate glue and bonded together to ensure the structural integrity of the panel. Different types of panels are made wherein a window or door frame is mounted at a suitable location. The method of manufacturing a rubber panel includes the steps of preforming a metal frame with mesh covering enclosed area, mixing an appropriate glue with shredded vehicle tires to form a mixture, place the mixture over the mesh, clamping the panel and placing it under pressure by a press and maintaining the pressure until the glue has set. Five rubber particles or a cement mixture can be applied over at least one exterior surface to create a smooth surface.

17 Claims, 3 Drawing Sheets

RUBBER BUILDING PANEL AND METHOD OF MANUFACTURING SAME

BACKGROUND OF THE INVENTION

This invention relates to building panels and methods of manufacturing same.

The problem of disposing of or recycling old tires has become a substantial problem in North America and elsewhere where automobiles and trucks are now common and used extensively. It will be appreciated that millions of tires are discarded every year in the United States and Canada alone. These tires are filling up disposal areas and garbage dumps and many tires end up littering the landscape. Although some uses have been found for recycling and reusing the material in rubber tires, more uses need to be found in order to use up and dispose of the substantial volume of old tires. Some proposals for using scrap rubber from tires include using this rubber material in railroad and landscaping ties, for loading dock bumpers and in the making of non-skid surfaces.

However attempts to recycle this tire rubber material in the past have not eliminated all of the problems that have arisen. Some of these recycling attempts have required that part of the tire be burned and this can result in pollution as well as a waste of some of the tire material. In some of the proposed uses for recycled tire material, not all of the tire material can be used and the material which cannot be used must be separated from the useful material which may be the actual rubber or synthetic rubber material. In some cases, the new product that is produced from the recycled material is too expensive to manufacture, making the product impractical.

The use of discarded rubber fragments in association with building products is known. For examples, U.S. Pat. No. 4,343,669 issued Aug. 10, 1982 to J. C. Prior describes a building component and method of making the same using shredded waste materials as an interior core and a sheet material providing a form casing. In this case, the shredded waste material provides insulation for the building component, but is not bound to it and is not used to increase the strength and supporting ability of the component.

U.S. Pat. No. 4,109,041 issued Aug. 22, 1978 to S. J. Tellman describes the use of discarded rubber tire fragments in conjunction with a construction panel, namely with particle-board, hardboard, plywood, fiberboard, or combinations thereof. The patent discloses the use of rubber from discarded tires as a coating for particle board in order to increase the surface friction of the board. Rubber is fixed to the particle-board by a method involving the combination of the rubber, wood flakes mixed with phenolic resin and binder being introduced between the plates of a heated molding press.

U.S. Pat. No. 5,238,734 issued Aug. 24, 1993 to K. N. Murray reveals the use of rubber fragments from discarded tires to make railroad ties. The rubber fragments are mixed with an epoxy mixture of a certain type.

U.S. Pat. No. 5,316,708 issued May 31, 1994 to T. Drews discloses a method for making building blocks from recycled vehicle tires. The process involves the use of shredded vehicle tires mixed with natural latex. The mixture is compressed for a sufficient amount of time to allow the latex to harden and cure.

In U.S. Pat. No. 5,439,735 issued Aug. 8, 1995 to D. G. Jamison, a method for using scrap rubber, scrap synthetic and textile material to create particle board products with desirable thermal and acoustical insulation parameters is disclosed. The method involves mixing rubber with various different substances in order to provide the rubber with necessary fire retardant, thermal, and acoustical insulation qualities.

It is an object of the present invention to provide a new type of panel for building construction which can be made from recycled tire material and which can be made at a reasonable cost.

It is a further object of the present invention to provide a rubber panel for building construction which can be used to construct walls that are well insulated and that can be made attractive by an inexpensive process such as painting.

It is a further object of the invention to provide a method of manufacturing a rubber panel for building construction which is relatively easy and which can employ recycled rubber or synthetic rubber material, if desired, as a primary raw material for the panel.

SUMMARY OF THE INVENTION

According to one aspect of the invention, a rubber panel for building construction comprises a metal frame in rectangular form and at least one layer of rubber fragments mixed with appropriate glue and bonded together to provide structural integrity to the panel. The one or more layers extend from one side of the frame to an opposite side thereof and the layer or layers are supported by the metal frame.

Preferably, the area enclosed by the frame is substantially covered with a metal mesh that can be positioned midway between a front and a back of the metal frame.

According to another aspect of the invention, a panel for building construction comprises a rigid rectangular frame constructed of metal frame members, each connected an opposite end thereof to adjacent frame members, and a metal supporting member connected to the frame members and extending across an area enclosed by the frame. At least one layer of a hardened mixture of rubber fragments and glue extends from one side of the frame to an opposite side thereof and is bonded to the frame and the supporting member.

Preferably this supporting member is a sheet of metal mesh substantially covering the area enclosed by the frame.

According to a further aspect of the invention, a method of manufacturing a rubber panel for building construction comprises preforming a rectangular metal frame and mixing a glue with rubber or synthetic rubber fragments to form an uncured mixture with the glue. A predetermined portion of the uncured mixture is placed in the metal frame so as to form at least one layer of the mixture extending from one side of the metal frame to an opposite side thereof. The one or more layers is placed under pressure in a press in order to squeeze the rubber fragments and the glue tightly together and to remove air spaces. The one or more layers is held under pressure until the glue has set and the rubber panel is formed.

In the preferred method, a supporting metal mesh is provided in the metal frame and at least a substantial portion of the area enclosed by the metal frame is covered by this mesh.

Further features and advantages will become apparent from the following detailed description taken conjunction with the accompanying drawings.

DETAILED DESCRIPTION OF PREFERRED EMBODIMENTS

Figure 1:
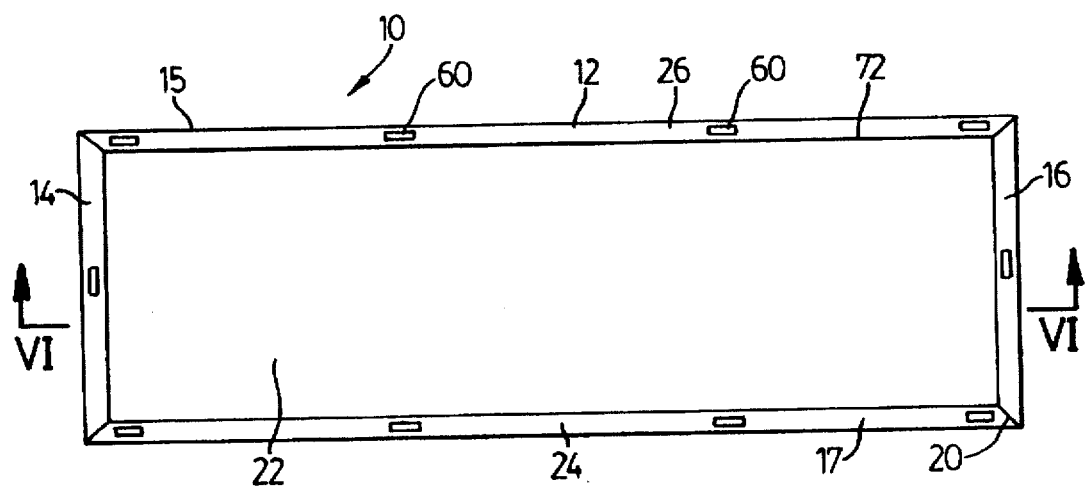
FIG. 1 is a front view of a preferred form of the rubber panel constructed in accordance with the invention.

FIG. 1 illustrates one preferred embodiment of a rubber panel 10 constructed in accordance with the invention and usable in building construction. The panel 10 includes a metal frame 12 in rectangular form. The term "rectangular" as used herein to describe the shape of a panel includes square panels. The frame 12 is constructed preferably of hollow metal tubes 14 to 17 with opposite ends of each tube mitred at a forty-five degree angle as indicated at 20. The adjacent ends of the tubes are rigidly connected together and this can be done by welding or by standard, separate connecting members (not shown). For example, a right angled connecting piece having two short arms can extend into the hollow ends of the tubes and these arms connected to the tubes by bolts, screws or rivets. The tubes 14 to 17 can be made of any suitably strong metal, aluminum, aluminum alloy and galvanized steel being three preferred metals. In one preferred embodiment of the panel 10, the panel is nine feet long by three feet wide while the thickness of the panel is about three inches. If the panel 10 is to be used in wall construction for joining with other building panels, with the panels having the lengthwise direction arranged vertically, it is preferred that they have a length of at least eight feet.

Each panel is formed with at least one layer 22 of rubber fragments mixed with an appropriate glue and bonded together to provide structural integrity and strength to the panel 10. The layer of bonded rubber fragments extends from one side, for example, side 24 of the frame 12 to an opposite side 26 of the frame and is supported by the frame.

Figure 4:
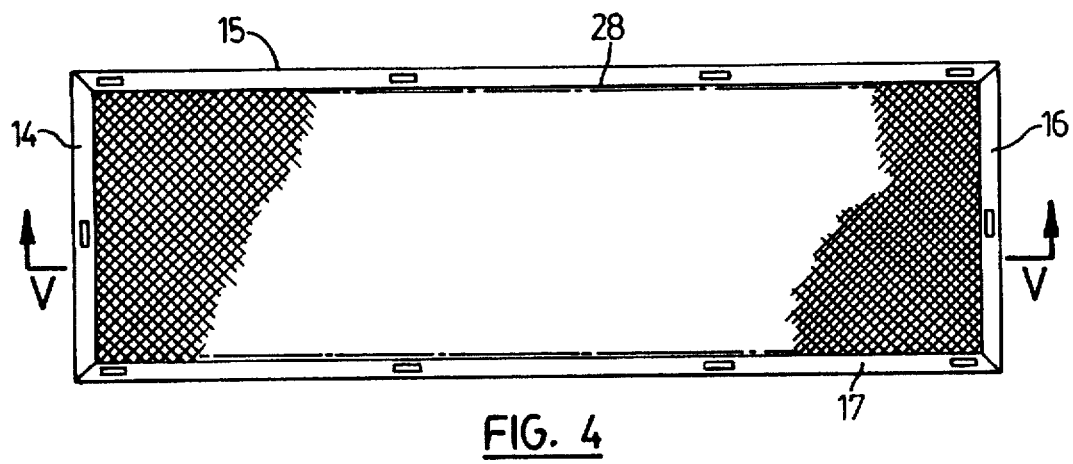
FIG. 4 is a front view of a partially completed panel, this view showing a metal mesh that covers the area formed by the metal frame.
Figure 5:
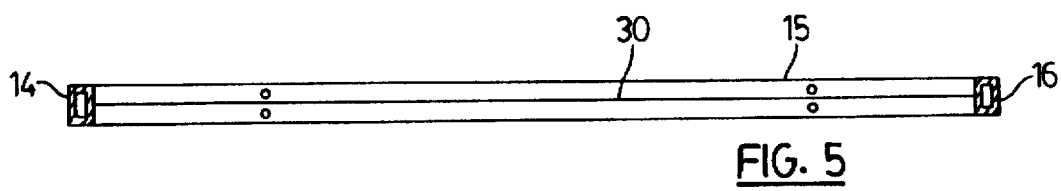
FIG. 5 is a cross-sectional detail view of the partially completed panel of FIG. 4, this view being taken along line V—V of FIG. 4.
Figure 6:
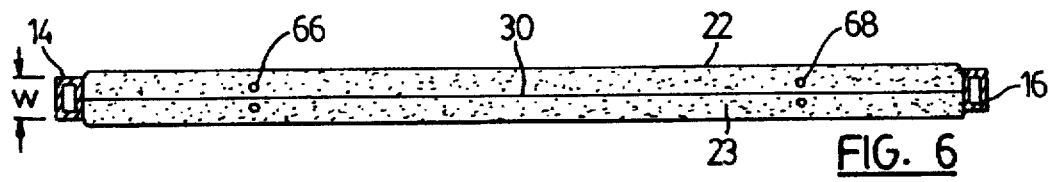
FIG. 6 is a cross-sectional detail of a completed rubber panel, this view being taken along the line VI—VI of FIG. 1.

As illustrated by FIGS. 4 to 6, the panel 10 preferably includes a metal supporting member connected to the frame members 14 to 17 and extending across an area 28 enclosed by the frame. In a preferred embodiment, this supporting member comprises a metal mesh or a sheet of expanded metal covered with small openings. This metal mesh 30 can be positioned so that it is in the plane of the front of the frame or the back of the frame but preferably the mesh is positioned midway between the front and the back of the metal frame 12 as shown. The mesh 30 can be rigidly connected to the inside of the metal frame by spot welding and it provides a strong supporting surface for the layer 22 of bonded rubber fragments. With the mesh 30 centrally located in the frame, there are preferably two layers of rubber fragments indicated at 22 and 23 in FIG. 6. These layers are of equal thickness and located on opposite sides of the metal mesh 30. In one preferred embodiment wherein the width of the tubes 14 to 17 indicated by W in FIG. 6 is three inches, the thickness of each layer of rubber fragments is approximately two inches so that the layer projects slightly from the side of the frame. Alternatively, each layer could be about one and a half inch so that its outer surface is flush with the front or rear side of the metal frame.

In order to keep the cost of the rubber panel of the invention reasonably low, it is preferable to use scrap rubber material from shredded tires in the panel. Such shredded rubber material is currently available in a variety of sizes. Of course most tires contain materials other than rubber or synthetic rubber such as steel and fibre reinforcing materials and these other materials can be ground up or shredded with the rubber. It may not be necessary to remove all or some of these materials from the rubber fragments in order to produce the desired panel 10. If one wishes to remove metal fragments from the scrap rubber materials before the rubber material is used in the panel, the metal scraps can be readily removed by well-known procedures using one or more magnets and other uses for the metal material can be found.

Figure 2:
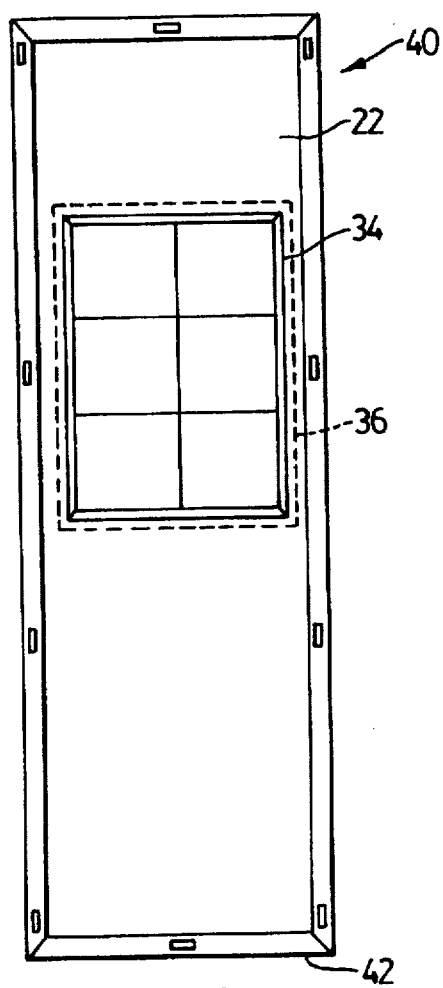
FIG. 2 is a front view of another embodiment of the rubber panel, this embodiment having a window provided therein.

FIG. 2 illustrates another embodiment of a rubber panel constructed in accordance with the invention, this embodiment being fitted with a window or a window frame at 34. If desired, a rectangular metal frame 36 (indicated in dash lines) to accommodate the window can be installed at the appropriate location in the panel during the process of manufacturing the panel, which process is described hereinafter. The metal frame 36, because it is installed prior to the glue setting, becomes bonded to the surrounding rubber layers 22, 23. By installing the actual window after the panel 40 is made, there is less danger of the window and the glass therein being damaged during the manufacturing process. The metal frame 36 would be installed at a normal height for a window, this height being measured from the bottom end 42 of this panel. Note that the window itself can be of a variety of types, including windows that open by either sliding movement or pivotal movement. The construction of the actual window does not form part of the present invention and therefore need not be described in detail herein.

Figure 3:
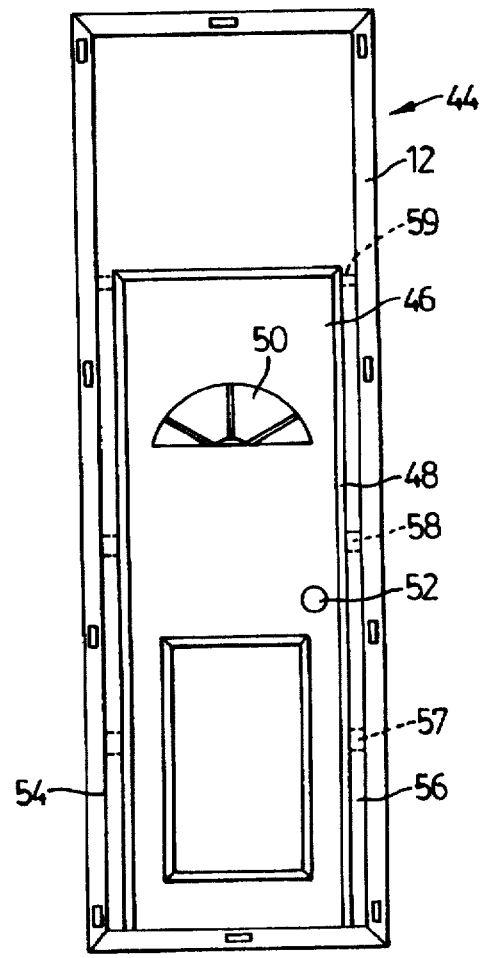
FIG. 3 is a front view of a further embodiment of the rubber panel, this embodiment having a door provided therein.

In the embodiment of FIG. 3, a door is mounted at a lower section of a rubber panel 44. The door 46 may itself be of standard construction and may be made of wood or sheet metal. The door is mounted on hinges (not shown) in the usual way and is mounted in a suitable metal door frame 48. The illustrated door 46 is an exterior door having a small window 50 and a hole for installation of a lock set at 52. It will be appreciated that in the panels 40 and 44, the supporting mesh 30 does not extend into the opening provided for the window or the door but extends only over the area inside the frame that is covered with layers of rubber fragments. It is also noted that in the panel of FIG. 3, narrow strips of rubber fragments can be provided at 54 and 56 between the door frame and the metal frame 12 of the panel. These strips allow for the difference in width between the door frame and the main metal frame 12 and they help absorb sound made by the opening and closing of the door from being transmitted to the metal frame 12 and the rest of the structure.

Additional metal connecting pieces, such as a short tubular sections, may be provided at 57 to 59 to rigidly connect the door frame to the frame 12.

The panels 10, 44 can be connected together by means of standard bolts, nuts and washers. For this purpose and also for running wiring through walls formed by the panels, rectangular access holes 60 are provided along the metal frame 12. Although the openings can be provided on both the front and back of a panel, in one embodiment they are provided only on the front side so as to retain the structural strength of the tubes 14 to 17 as much as possible. In the illustrated panels 10, 40 and 44, there is one access hole 60 in the middle of each of the shorter end frames and there are four access holes distributed evenly along each of the longitudinally extending tubular frames. These holes should be sufficiently large to insert one or two short bolts into the hole and through a round bolt hole 62 formed in the outer wall of the tube (see FIG. 6). In the adjoining panel, a nut or a washer and nut is inserted into the corresponding hole 60 for connection to the bolt and, in this way, adjacent edges of similar panels can be rigidly connected together. In a similar manner, the top of the panel can be connected to a ceiling or a joist and the bottom end of the panel can be connected to a floor or a foundation support.

Provision may also be made in the panels of the invention for running electrical wiring or conduits for electrical wiring through the panels. As shown in FIG. 6, the ends of longitudinally extending tubes 15 and 17 can be provided with openings 64 at each end to permit the electrical wiring to be fed easily through the end tubes 14 and 16. In the alternative, or in addition, suitable metal tubes 66 and 68 can be provided for wiring in the rubber layers themselves, these tubes being installed during the manufacturing process. These tubes can be provided at a standard height from the bottom end or from each end of the panel, for example, a height at which one would normally install an electrical outlet. The tubes 66 and 68 can be placed on each side of the metal mesh 30 or only one side, as desired. The tubes can be completely enclosed in the layer of rubber fragments and the location of the tubes could be suitably marked on the panels after they are made so that each tube can be readily located by an electrical installer. Holes for wiring can also be provided at each end of the short tubes 14 and 16 to permit the electrical wiring to be run up or down in the longitudinal tubes 15, 17.

Figure 8:
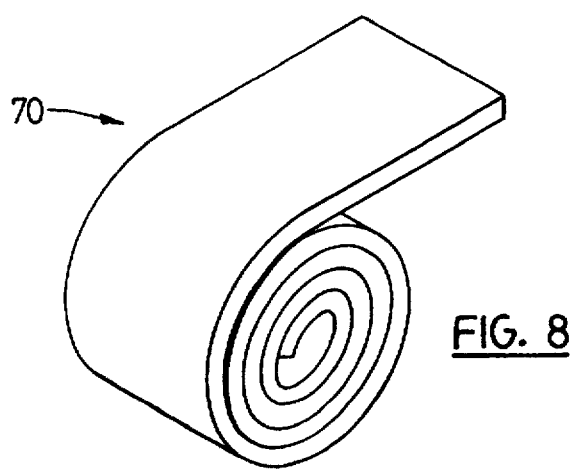
FIG. 8 is a perspective view of a partially coiled strip of rubber that can be used when installing the panels of the invention.

As explained above, the rubber fragment layers 22, 23 have a combined total thickness which is one inch greater than the thickness of the metal frame 12. In this way, each layer 22 or 23 projects above one half inch (or less) from the adjacent side of the metal frame. When the panels are connected together to form a building wall, this will leave strips of bare metal at these joints where panels are connected. These bare metal strips can then be covered by means of a strip of rubber indicated at 70 in FIG. 8. This strip of rubber can be packaged and shipped in a coiled form and the length of the strip would correspond to the length of the manufactured panel 10. If the longitudinal tubes 15, 17 are three inches wide so that the combined width is six inches, the width of the strip 70 is six inches. If the panels are constructed so that the rubber layers project one half inch from the metal frame on each side, the thickness of the rubber strip 70 is also one half inch. After the panels have been connected together to form a wall or other structural surface, adjoining tubes can be covered by means of the rubber strip 70, thus leaving a smooth, attractive wall surface that can be painted or otherwise suitably decorated. The strip 70 is attached by means of an adhesive suitable for bonding rubber to metal.

In a preferred version of the panels 10, 40 and 44, a thin strip of silicon sealant is arranged at 72 between each tubular frame 14 to 17 and the rubber fragment layer. This silicon sealant helps prevent against any air leakage in the joint between the rubber fragment layer and the metal frame due to a small gap or hole left by the manufacturing process.

Figure 9:
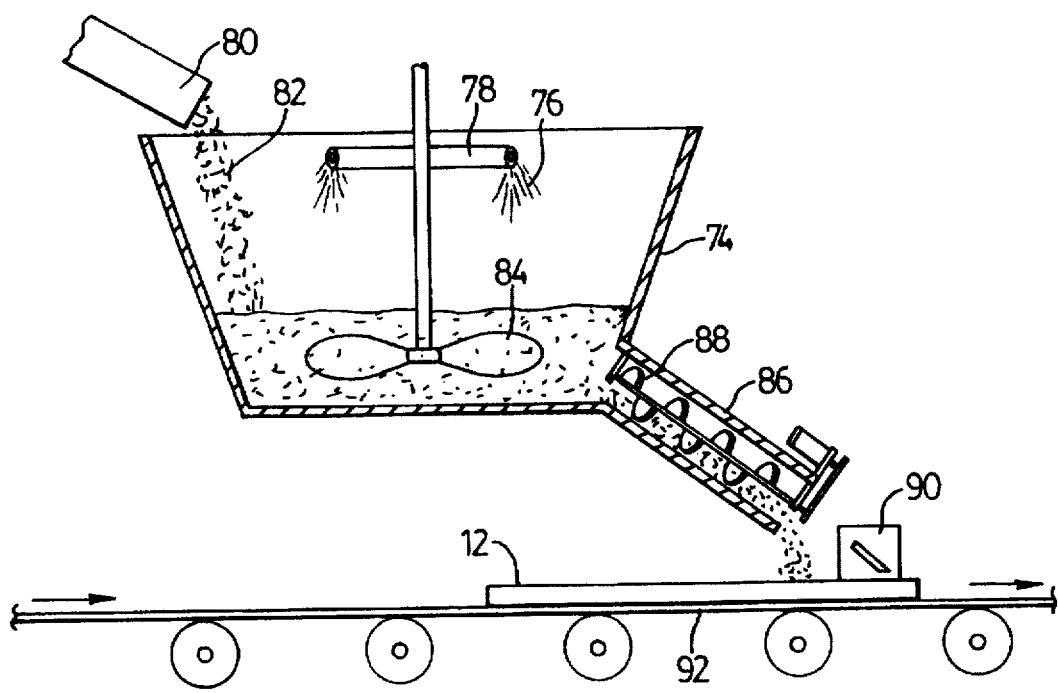
FIG. 9 is a schematic illustration showing a machine that can be used to mix glue and rubber fragments to form a mixture, which mixture is deposited in the enclosed space formed by a metal frame.

The process for manufacturing the panels 10 will now be described with particular reference to FIGS. 9 and 10. Prior to using the ground up rubber materials or chunks from tires or other rubber products, this rubber material is preferably cleaned with a suitable cleaning solution. By cleaning the rubber fragments initially, the rubber panels produced from the rubber fragments will be hygienically safe. In order to manufacture the rubber panel 10 for building construction, the aforementioned rectangular metal frame 12 is formed. Preferably the metal frame is provided with a supporting metal mesh 30 and at least a substantial portion of the area enclosed by the metal frame 12 is covered by this metal mesh. As shown in FIG. 9, an uncured mixture of a suitable rubber glue is mixed in a mixer 74. The glue 76 can be sprayed onto the rubber fragments as shown from a sprayer 78 in a suitable ratio of glue to rubber. Rubber fragments of a suitable size or of a suitable variety of sizes enter the mixer through a chute 80, the falling fragments being indicated at 82. The size of the rubber material can vary from chunks of a half inch or more to granules to rubber dust. A mechanical stirrer 84 is provided in the mixer for thoroughly mixing the glue and the rubber fragments. The uncured mixture is then delivered through a bottom outlet 86 for deposit in the interior area of the frame. One or more augers 88 can be provided to move the mixture through the outlet. Other forms of mechanical conveying devices could also be provided in the outlet 86. The width of the outlet 86 can be made to correspond to the width of the rectangular area inside the frame 12 so that uncured mixture can be deposited across the width of this area. A predetermined portion of the uncured mixture is placed in the metal frame so as to form at least one layer of the mixture extending from one side of the metal frame to an opposite side thereof. A scraper in the form of a fixed or moving blade 90 can be provided above a moving conveyor 92 in order to spread the uncured mixture evenly and to remove any excess. The frame 12 can be moved past the outlet 86 on the conveyor 92 to the next work station. If an uncured layer of rubber fragments is to be provided on both sides of a metal mesh 30, once the layer 22 has been deposited on one side of the panel 10, the layer 22 can be covered for support, the panel is flipped over 180 degrees, and a layer of the uncured mixture is then deposited on top of the exposed metal mesh. In order to prevent the uncured mixture of glue and rubber from adhering to the surface of the conveyor 92 or other supporting surface, a low cost plastic sheet can be placed over the conveyor or the supporting surface to prevent the uncured mixture from being deposited directly on or sticking to the conveyor or supporting surface. The same protective plastic sheet or sheets can also be employed during the pressing operation described below. After the panel 10 has been formed and the uncured mixture has set, the plastic sheet can be removed from the surface of the panel, particularly if the plastic material and the glue are selected so that the glue, when hardened, does not stick or does not stick firmly to the plastic sheet material.

Figure 10:
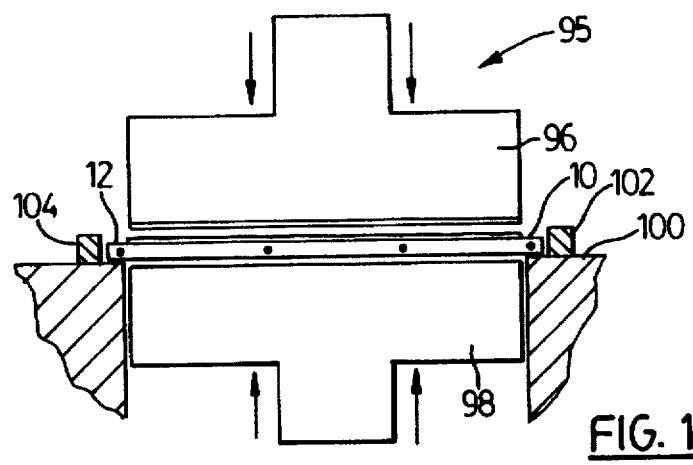
FIG. 10 is a schematic illustration of a press that can be used to form a rubber panel of the invention.

The next step in the manufacturing process is to place the one or more layers of the uncured mixture under pressure in a press indicated schematically at 95 in FIG. 10. The press 95 squeezes the rubber fragments and glue tightly together and helps to remove air spaces that may be left in one or more of the layers after they have been deposited on the frame. One or more layers 22, 23 are held under pressure until the glue has set and the rubber panel 10 is formed. In the illustrated press 95, which press can be hydraulically operated by rams (not shown), there is a movable upper pressure plate or platen 96 and a lower pressure plate or platen 98. Because both pressure plates 96 and 98 apply pressure equally to the rubber fragment layers on both sides of the panel, there is little or no pressure or force supplied to metal frame of the panel or the metal mesh. These are not damaged or distorted. The metal frame 12 can be itself supported during the pressing operation and a suitable, rectangular support surface 100 provided with a rectangular opening for the passage of the lower platen 98. Also preferably, there can be provided supporting blocks or frame members 102 and 104 affixed to the supporting surface 100 and they help support the metal frame along its outer walls and further help to ensure that the metal frame 12 is correctly positioned for the pressing operation. It will be understood that the blocks 102, 104 can be provided on all four sides of the metal frame.

In order that the press 95 will not be tied up for an undue length of time while the mixture of rubber fragments cures, it also possible to provide strong, clamping frames between the press platens 96, 98 and the rubber fragment layers 22, 23. By providing the strong clamping frames (not shown), once the rubber layer has been suitably compressed in the press 95, the clamping frames can be secured together in a clamping position to keep the required pressure on the rubber layers and then the uncured panel 10 together with the clamping frames can be removed from the press and the combination placed at a suitable location until the curing of the panel has been completed. Again, suitable plastic sheeting can be placed between the uncured rubber layers and the inside surfaces of the clamping frames to permit easy removal of the clamping frames after curing has taken place.

In a preferred method for making the panel 10 and in order to provide the finished panel with a relatively smooth, even surface, after the layers of rubber fragments have cured, a fine layer of dust-like rubber material is applied over an outer surface of at least one of the rubber layers. This fine rubber material can be bonded to the outer surface by first applying in any suitable manner an adhesive to the outer surface. The adhesive or glue can be applied by brushing or spraying, for example. It will be understood that this fine outer layer is applied after the panel 10 has been removed from the press 95 or from the clamping frames. By forming a smooth, unbroken exterior surface in this manner, the panel can be easily painted after installation.

Figure 7:
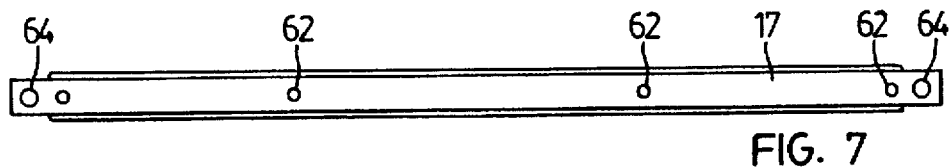
FIG. 7 is an edge view showing a long edge of the panel of FIG. 1.
Figure 11:
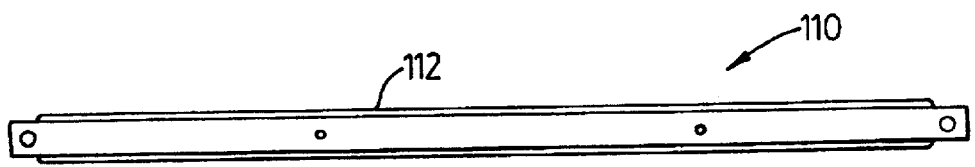
FIG. 11 is an edge view similar to FIG. 7 but illustrating an alternate version having a cement based outer layer.

Instead of the aforementioned fine rubber material, one can instead apply a suitable mixture of cement, sand, and water to form a relatively thin, smooth cement based layer which is fire resistant. Such a layer could be applied to one or both sides of the panel depending on the intended use of the panel. A panel 110 having a cement based outer layer 112 on one side is illustrated in FIG. 11. Except for the construction of the outer layer, the panel 110 can be similar to that of FIGS. 1 and 7.

If desired, the cement based outer layer can be made with a liquid bonding admixture such as that sold under the trade-mark AKKRO-7T by Tamms Industries of Mentor, Ohio. AKKRO-7T is a non-reemulsifiable, high solids, liquid bonding admixture that improves the physical properties, cure and adhesion of portland cement. The addition of such known admixtures can help reduce shrinking and cracking.

Rubber panels constructed in accordance with the invention can be used in the construction of houses comprising one or two storeys. The panels can also be used to make temporary, emergency dwellings. Although the panels 10 of the invention may be preferred for use in the construction of exterior walls of dwellings because of their ability to provide excellent insulation, they can also be used to construct interior walls, particularly interior walls where a sound insulating capability is desired. Houses and other dwellings made with the present panels can be made architecturally attractive because, as indicated, windows, doors and other desirable features can be built into or installed in these panels. The panels are preferably painted after installation in order to improve their attractiveness and also to prevent any undesired smell being emitted from the rubber material.

Although it is believed that the panels of the invention can be manufactured at a reasonable cost, the comparative cost may be even further reduced by the fact that manufacturers of the panels may be able to obtain money or subsidies from state or other government authorities because they are using up old tires and recycling all of the tire material, material which might otherwise have to be sent to expensive landfill sites or other disposal areas. Also, panels in accordance with the invention can be constructed with all or most of the material from old tires. In the case of metal chunks, strips or fibres that are felt to be undesirable in the panels 10, it is possible to remove this metal material from the other tire material by means of magnets or other sorting processes and, generally speaking, such metals have other uses and can be readily recycled.

In addition to use in buildings as described, as all these panels are made with rubber layers which are air-tight and lighter than cement, these panels may also find use for containing water along river banks and streams.

In order to make the exterior surfaces of the panels as smooth and even as possible, it is possible to deposit the layers of rubber fragments so that layers with larger chunks of rubber are deposited first along the interior of the panel and then the coarser layer is covered with a less coarse mixture of rubber fragments and glue. The final layer is a layer of rubber dust as explained already above.

Although this invention has been described with respect to certain specific embodiments, those skilled in the art will recognize that various alterations and modifications may be made to these embodiments without departing from the spirit and scope of this invention. Such equivalents are within the scope of this invention, which is limited only by the claims that follow.

I therefore claim:

1. A rubber panel for building construction comprising a metal frame in rectangular form, and at least one layer of rubber fragments mixed with a glue and bonded together to provide structural integrity to the panel, wherein said at least one layer is connected to said metal frame and extends from one side of said frame to an opposite side thereof and is supported thereby.

2. The rubber panel of claim 1, wherein the area enclosed by the frame is substantially covered with a metal mesh positioned midway between a front and a back of the metal frame.

3. The rubber panel of claim 1, wherein said metal frame is constructed of hollow metal tubes with opposite ends of each tube mitred at a forty five degree angle, and adjacent ends of said tubes are rigidly connected together.

4. The rubber panel of claim 3, wherein said metal frame has a width of at least three feet and a length of at least eight feet.

5. The rubber panel of claim 1, wherein said at least one layer includes reinforcing materials present in shredded vehicle tires.

6. The rubber panel of claim 1, wherein said rubber fragments are of different sizes, including chunks, granules and dust.

7. The rubber panel of claim 2, wherein said metal frame has holes formed at intervals therein, said holes being suitable for passage of electrical wiring.

8. The rubber panel of claim 2, wherein there is a layer of rubber fragments mixed with glue on each side of said metal mesh and the two layers of rubber fragments are bonded to one another and to said metal mesh.

9. The rubber panel of claim 1, wherein a window frame is mounted in said panel and within said metal frame.

10. The rubber panel of claim 1, wherein a door frame is mounted in said panel and within said metal frame.

11. The rubber panel of claim 2 wherein said at least one layer is coated with a thin layer of cement based material which forms an outer surface of the panel.

12. A panel for building construction comprising:
- a rigid, rectangular frame constructed of metal frame members, each connected at opposite ends thereof to adjacent frame members;
- a metal supporting member connected to said frame members and extending across an area enclosed by said frame; and
- at least one layer of a hardened mixture of rubber fragments and glue extending from one side of said frame to an opposite side thereof and bonded to said frame and said supporting member.

13. A panel according to claim 12 wherein said supporting member is a sheet of metal mesh substantially covering said area enclosed by said frame.

14. A panel according to claim 13 wherein said metal frame members are hollow, tubular members made of aluminum or aluminum alloy and said metal mesh is welded to said frame members.

15. A panel according to claim 14 wherein said metal frame has a front side and a rear side, said metal mesh is positioned about midway between said front and rear sides, and there are two layers of said hardened mixture, one layer on each side of said metal mesh.

16. A panel according to claim 14 wherein a fine layer of dust-like rubber material extends over an exterior surface of said at least one layer of said hardened mixture.

17. A panel according to claim 12 wherein a thin layer of cement based material extends over an exterior surface of said at least one layer of said hardened mixture.

* * * * *